US010724458B2

United States Patent
Zhao et al.

(10) Patent No.: US 10,724,458 B2
(45) Date of Patent: Jul. 28, 2020

(54) METHODS AND SYSTEM FOR CONTROLLING ENGINE STARTING

(71) Applicant: Ford Global Technologies, LLC, Dearborn, MI (US)

(72) Inventors: Yanan Zhao, Ann Arbor, MI (US); Chen Zhang, Canton, MI (US); Xiaoyong Wang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 354 days.

(21) Appl. No.: 15/729,384

(22) Filed: Oct. 10, 2017

(65) Prior Publication Data

US 2019/0107069 A1    Apr. 11, 2019

(51) Int. Cl.

| | | |
|---|---|---|
| *F02D 41/06* | (2006.01) | |
| *F02N 11/08* | (2006.01) | |
| *F02D 29/02* | (2006.01) | |
| *B60W 10/06* | (2006.01) | |
| *B60W 10/08* | (2006.01) | |
| *B60W 10/10* | (2012.01) | |
| *B60W 10/18* | (2012.01) | |
| *B60W 10/26* | (2006.01) | |
| *B60W 20/40* | (2016.01) | |
| *F02D 25/00* | (2006.01) | |
| *F02D 41/26* | (2006.01) | |

(52) U.S. Cl.
CPC ............ *F02D 41/062* (2013.01); *B60W 10/06* (2013.01); *B60W 10/08* (2013.01); *B60W 10/10* (2013.01); *B60W 10/18* (2013.01); *B60W 10/26* (2013.01); *B60W 20/40* (2013.01); *F02D 25/00* (2013.01); *F02D 29/02* (2013.01); *F02N 11/0833* (2013.01); *B60Y 2200/92* (2013.01); *F02D 41/26* (2013.01); *F02N 11/0814* (2013.01); *F02N 11/0862* (2013.01); *F02N 2200/061* (2013.01); *F02N 2200/0801* (2013.01); *F02N 2200/10* (2013.01); *Y10S 903/93* (2013.01)

(58) Field of Classification Search
CPC ........ F02D 41/062; F02D 29/02; F02D 25/00; F02D 41/26; F02N 11/0833; F02N 2200/10; F02N 2200/061; F02N 2200/0801; F02N 11/0862; F02N 11/0814; B60W 20/40; B60W 10/26; B60W 10/18; B60W 10/10; B60W 10/08; B60W 10/06; B60W 20/00; B60Y 2200/92; Y10S 903/93
See application file for complete search history.

(56) References Cited

U.S. PATENT DOCUMENTS

| | | | | |
|---|---|---|---|---|
| 7,647,908 B1* | 1/2010 | Biondo | ................... | F02D 28/00 123/179.2 |
| 9,440,654 B2 | 9/2016 | Atluri et al. | | |
| 2004/0138026 A1* | 7/2004 | Carriere | .................. | F02B 73/00 477/166 |
| 2014/0195089 A1* | 7/2014 | Kobayashi | ............ | F02N 11/006 701/22 |

(Continued)

*Primary Examiner* — Mary Cheung
(74) *Attorney, Agent, or Firm* — David Kelley; McCoy Russell LLP

(57) ABSTRACT

Systems and methods for operating a hybrid powertrain of a vehicle that includes an engine and a motor/generator are described. The systems and methods may judge whether or not to generate an engine start request when an engine is stopped in response to present vehicle operating conditions and predicted vehicle operating conditions.

20 Claims, 8 Drawing Sheets

(56) References Cited

U.S. PATENT DOCUMENTS

| | | | |
|---|---|---|---|
| 2014/0309910 A1* | 10/2014 | Hesketh | F02N 11/0822 |
| | | | 701/112 |
| 2015/0345458 A1* | 12/2015 | Schramme | F02N 11/0825 |
| | | | 701/33.7 |
| 2015/0367842 A1* | 12/2015 | Nakanishi | B60K 6/48 |
| | | | 701/22 |
| 2016/0243947 A1 | 8/2016 | Perkins et al. | |
| 2016/0244044 A1 | 8/2016 | Miller et al. | |
| 2016/0297443 A1* | 10/2016 | Kato | B60T 7/122 |
| 2017/0028978 A1 | 2/2017 | Dunlap et al. | |

* cited by examiner

METHODS AND SYSTEM FOR CONTROLLING ENGINE STARTING

FIELD

The present description relates to methods and a system for operating a powertrain of a hybrid vehicle. The methods and systems may be particularly useful for hybrid vehicles that temporarily stop an engine of the powertrain to conserve fuel.

BACKGROUND AND SUMMARY

A hybrid vehicle may include an engine and an electric motor as propulsion sources. The engine may be stopped from time to time to conserve fuel. For example, if the vehicle is traveling downhill or if driver demand torque is less than a threshold torque, the engine may be stopped to conserve fuel. The engine may be restarted to provide torque if driver demand increases or if battery state of charge is reduced to less than a threshold amount of charge. However, because driving conditions may vary, it may be possible to restart the engine and then stop the engine after a few seconds because driving conditions change. Starting the engine for only a few second and then stopping the engine may degrade fuel economy, increase starting component degradation, and aggravate vehicle occupants. Further, there may be little if any benefit realized for starting the engine. Therefore, it may be desirable to provide a way of improving the engine starting decision process so that engine starting may be avoided if engine starting will provide little benefit, while also allowing engine starting if engine starting is expected to provide useful benefit.

The inventors herein have recognized the above-mentioned issues and have developed a powertrain operating method, comprising: receiving data to a controller; adjusting a state of a first engine start request generated via a first control agent responsive to the data; adjusting a state of a second engine start request generated via a second control agent responsive to predicted vehicle conditions; and starting or not starting an engine responsive to arbitration of the first engine start request and the second engine start request.

By providing two control agents that generate different engine starting requests responsive to present vehicle operating conditions and predicted vehicle operating conditions, it may be possible to provide the technical result of improved engine starting decision making. The engine may not be started or it may be started via the improved decision making process. The engine starting decisions may be made responsive to battery state of charge, propulsion motor torque, driver demand torque, and other conditions. The conditions may be evaluated by first and second control agents and then the control agents may request an engine start. An arbitration logic section makes a final determination as to whether or not an engine start request is issued and the engine is started.

The present description may provide several advantages. For example, the approach may reduce a number of times an engine is started and run for a short period of time. Further, the approach may reduce engine starting component degradation. In addition, the approach may be applied to different conditions that may be the basis for engine starting.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
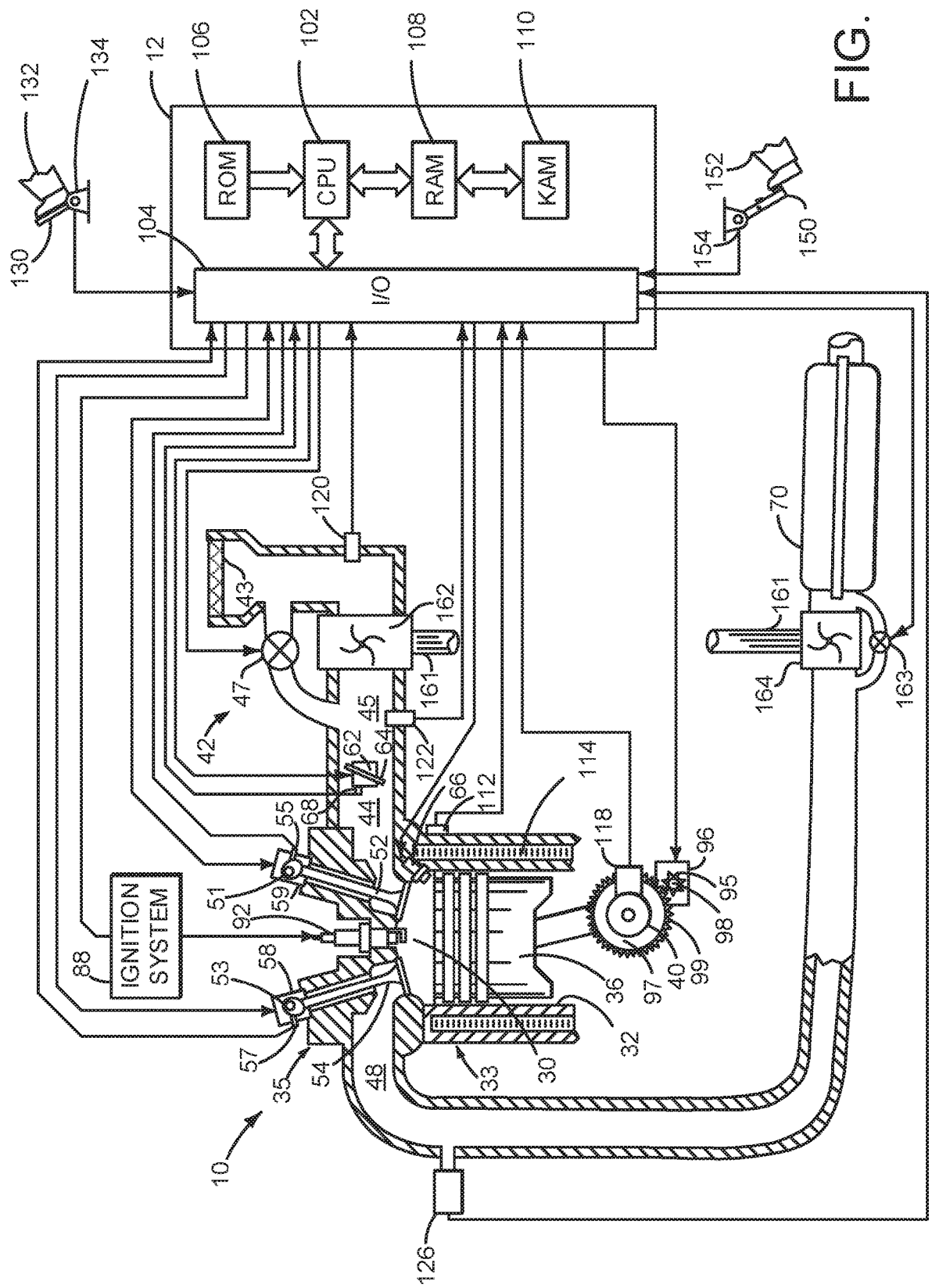
FIG. 1 is a schematic diagram of an engine.

The present description is related to operating a driveline of a hybrid vehicle. The driveline may include an engine and a motor. The engine and the motor may be selectively coupled or continuously coupled. FIG. 1 shows an example engine for the hybrid vehicle. The engine is shown with a motor as part of a hybrid driveline or powertrain in FIG. 2. The hybrid driveline may be operated as is shown in FIG. 3 to improve decisions regarding engine starting. Two different agents, one that considers present vehicle operating conditions, and one that predicts future vehicle operating conditions, form a basis for determining whether or not to start an engine.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human foot 132; a position sensor 154 coupled to brake pedal 150 for sensing force applied by human foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
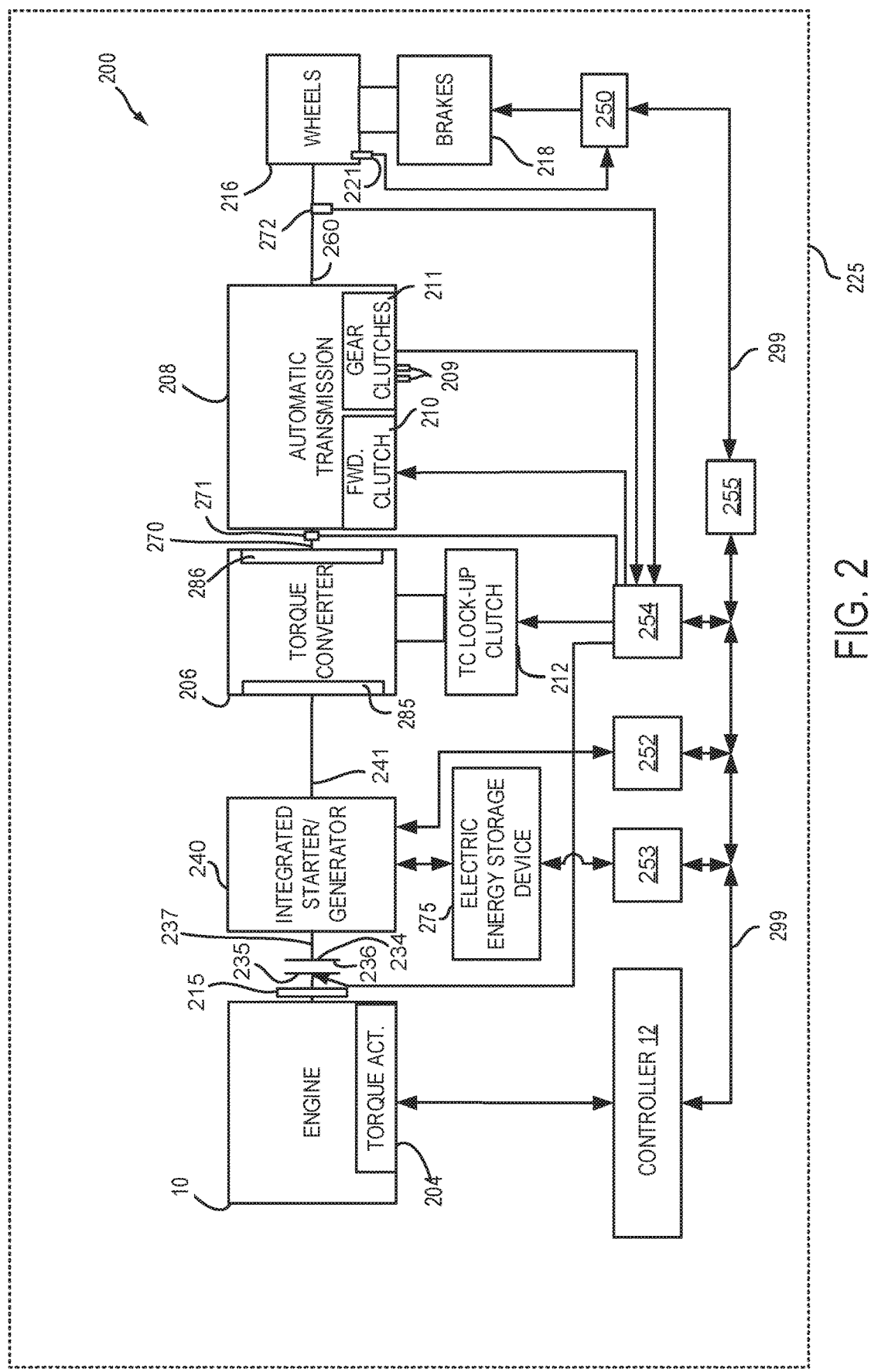
FIG. 2 is a schematic diagram of a hybrid vehicle driveline.
Figure 3:
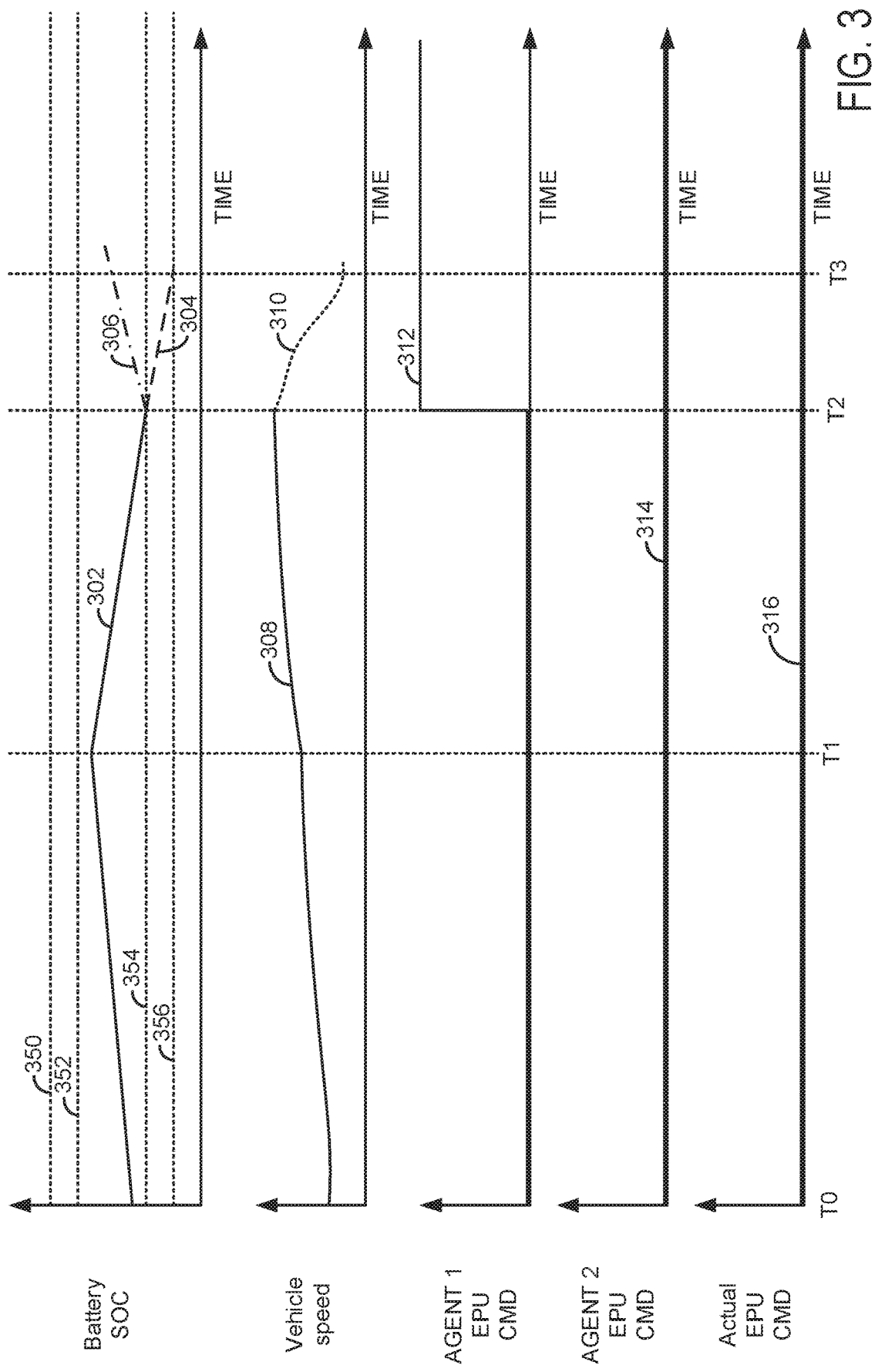
FIG. 3 shows an example driveline operating sequence according to the method of FIG. 5.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers. In this example, powertrain 200 may be powered by engine 10 and electric machine 240.

In other examples, engine 10 may be omitted. Engine 10 may be started with an engine starting system shown in FIG. 1 or via integrated starter/generator (ISG) 240 also known as a motor/generator. ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 is in electrical communication with energy storage device 275. ISG 240 has a higher output torque capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Thus, the system of FIGS. 1 and 2 provides for a system, comprising: an engine; a motor/generator selectively coupled to the engine; and a controller including executable instructions stored in non-transitory memory to generate a first engine start request responsive to present vehicle operating conditions via a first control agent, instructions to generate a second engine start request responsive to predicted vehicle operating conditions via a second control agent, and instructions to start or not start the engine responsive to the first engine start request and the second engine start request. The system further comprises additional instructions to predict vehicle speed and driver demand torque via the second control agent. The system further comprises additional instructions to determine a time a condition is met, the condition a basis for generating the second engine start request. The system includes where the second engine start request is generated further based on a desired minimum engine run time. The system includes where the engine is stopped when the first and second engine start requests are generated. The system includes where the engine is started when both the first engine start request and the second engine start request are contemporaneously asserted. The system includes where an engine request is not generated when both the first engine start request and the second engine start request are not contemporaneously asserted.

Referring now to FIG. 3, example plots of a vehicle operating sequence are shown. The operating sequence may be performed via the system of FIGS. 1 and 2 in cooperation with the methods of FIGS. 4-8. Vertical lines at times T0-T3 represent times of interest during the sequence. The plots in FIG. 3 are time aligned and occur at the same time.

The first plot from the top of FIG. 3 is a plot of battery state of charge (SOC) versus time. Trace 302 represents the actual battery SOC. Trace 306 represents battery SOC predicted via the second agent and trace 304 represents battery SOC predicted via the first agent. The vertical axis represents battery state of charge and battery state of charge increases in the direction of the vertical axis arrow. The horizontal axis represents time and time increases from the left side of the figure to the right side of the figure. Horizontal line 350 represents a maximum battery SOC limit or threshold. Horizontal line 352 represents an upper battery SOC threshold. Horizontal line 354 represents a lower battery SOC limit or threshold. Horizontal line 356 represents a minimum battery SOC threshold.

The second plot from the top of FIG. 3 is a plot of vehicle speed versus time. Trace 308 represents actual vehicle speed. Trace 310 represents predicted vehicle speed. The vertical axis represents vehicle speed and vehicle speed increases in the direction of the vertical axis arrow. The horizontal axis represents time and time increases from the left side of the figure to the right side of the figure.

The third plot from the top of FIG. 3 is a plot of state of an engine pull-up (EPU) command (CMD) or engine start request versus time. Trace 312 represents engine pull-up command as determined via a first agent. The vertical axis represents engine pull-up command state as determined via the first agent and the engine pull-up command is asserted when trace 312 is at a higher level near the vertical axis arrow. The engine pull-up command as determined via the first agent is not asserted when trace 312 is at a lower level near the horizontal axis. The horizontal axis represents time and time increases from the left side of the figure to the right side of the figure.

The fourth plot from the top of FIG. 3 is a plot of state of an engine pull-up (EPU) command (CMD) or engine start request versus time. Trace 314 represents engine pull-up command as determined via a second agent. The vertical axis represents engine pull-up command state as determined via the second agent and the engine pull-up command is asserted when trace 314 is at a higher level near the vertical axis arrow. The engine pull-up command as determined via the second agent is not asserted when trace 314 is at a lower level near the horizontal axis. The horizontal axis represents time and time increases from the left side of the figure to the right side of the figure.

The fifth plot from the top of FIG. 3 is a plot of state of an actual engine pull-up (EPU) command (CMD) or engine start request versus time. Trace 316 represents an engine pull-up command used by a controller for starting or not starting the engine. The state of trace 316 indicates whether or not the engine should actually be started, whereas traces 312 and 314 are variable states that enter into the final determination of the state of trace 316. The vertical axis represents engine pull-up command state from which the engine is or is not started. The engine pull-up command state is asserted when trace 316 is at a higher level near the vertical axis arrow. The engine pull-up command is not asserted when trace 316 is at a lower level near the horizontal axis. The horizontal axis represents time and time increases from the left side of the figure to the right side of the figure.

At time T0, the engine is stopped as is indicated by the actual EPU state being at a lower level and the battery SOC is between threshold 354 and threshold 352. The vehicle speed is at a middle level and the first and second agents are not requesting an EPU or engine start. Between time T0 and time T1, the battery SOC increases and the vehicle speed increases. The first and second agents do not request an EPU. In addition, an EPU is not actually requested.

At time T1, the battery SOC begins to decrease and the vehicle speed increases. The first and second agents do not request an EPU. Between time T1 and time T2, the battery SOC continues to decreases and the vehicle speed continues to increase. The first and second agents do not request an EPU. Further, an EPU is not actually requested.

At time T2, battery SOC is less than threshold 354 so the first agent requests EPU. However, the second agent does not request an EPU because the second agent predicts that battery SOC will increase between time T2 and time T3 as indicated by trace 306. Based on present vehicle conditions, the first agent estimates that battery SOC will be reduced to the level of threshold 356 at time T3. The predicted vehicle speed at time T2 decreases as indicated by trace 310. An actual EPU is not requested even though the first agent requests an EPU because the second agent indicates that no EPU is needed. The sequence ends at time T2 though parameters including predicted vehicle speed and predicted battery SOC are predicted out to time T3.

Figure 4:
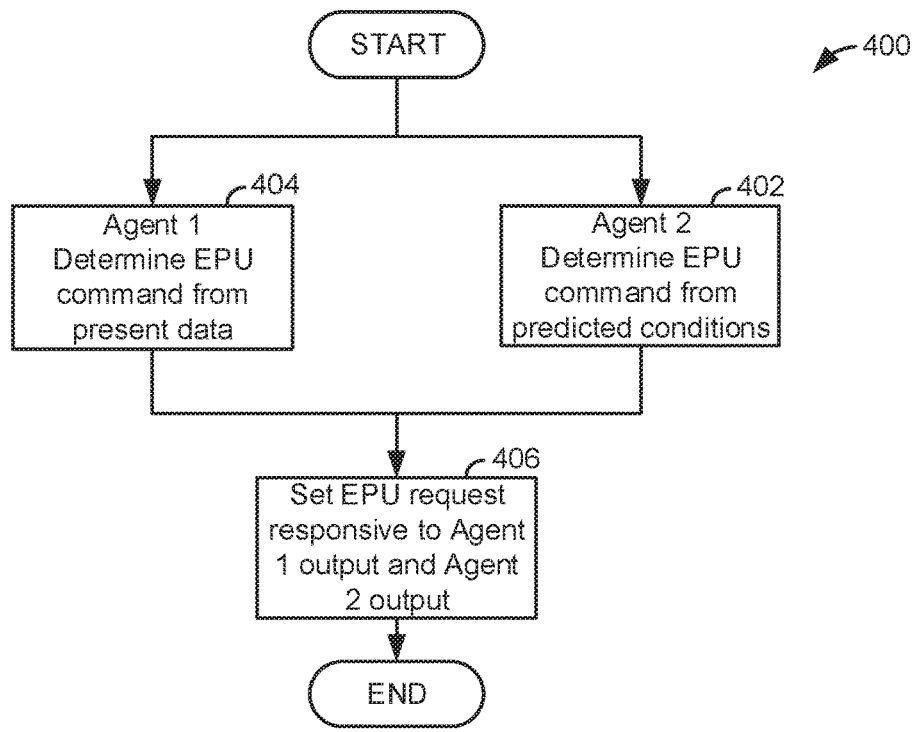
FIGS. 4-8 show methods that apply to different decision agents to determine whether or not to start an engine of a hybrid vehicle.

Referring now to FIG. 4, a high level block diagram of methods to determine whether or not an EPU should occur is shown. The method of FIG. 4 is a generic version of the methods shown in FIGS. 5-8. The methods of FIGS. 4-8 may be included as executable instructions stored in non-transitory memory of the system of FIGS. 1 and 2. In addition, the methods of FIGS. 4-8 may work in cooperation with the system of FIGS. 1 and 2 to receive data and adjust actuators to control the system of FIGS. 1 and 2 in the physical or real world. The methods of FIGS. 4-8 may be applied when an engine is stopped, not rotating, and not combusting air and fuel.

Method 400 includes two control agents. A first control agent (e.g., a section or module of control code or executable instructions stored in controller non-transitory memory) at 404 judges whether or not an EPU request should be initiated or undertaken according to present vehicle operating conditions. Present vehicle operating conditions may include but are not limited to battery SOC, battery discharge power, maximum motor torque, present motor torque, driver demand torque, and battery charging and discharging thresholds or limits. If the first control agent judges that an EPU is desired, it relays the EPU request to an arbitrator section 406. The EPU request from the first control agent may be indicated by a variable in memory taking on a value of one. The EPU request from the first control agent is not asserted when the value of the variable in memory is zero.

The second control agent (e.g., a section or module of control code or executable instructions stored in controller non-transitory memory) at 402 judges whether or not an EPU request should be initiated or undertaken according to predicted vehicle operating conditions. The predicted vehicle operating conditions may include but are not limited to battery SOC, vehicle speed, driver demand power, a time in the future where an event is predicted to occur. The second control agent predicts the vehicle operating conditions and requests an EPU or engine start if conditions responsive to the predicted vehicle operating conditions do not meet predetermined criteria. If the second agent judges that an EPU is desired, it relays the EPU request to the arbitrator at section 406. The EPU request from the second control agent may be indicated by a variable in memory taking on a value of one. The EPU request from the second control agent is not asserted when the value of the variable in memory is zero.

At 406, an arbitrator judges whether or not an actual EPU should be requested responsive to EPU requests provided by the first agent and the second agent. In one example, the arbitrator issues an actual EPU, from which the engine is started, when the logical "AND" product of the value of the variable representing the EPU request from the first agent and the value of the variable representing the EPU request from the second agent is a value of one. Otherwise, the arbitrator does not issue an actual EPU request. The engine is started when the EPU request is asserted. The engine is not started when the EPU request is not asserted.

Thus, the actual EPU request is based on a present condition EPU request from the first control agent and a predicted condition EPU request from the second control agent. The engine is started or not started responsive to the value of the actual EPU request. For example, the engine is started when the actual EPU request value is one. The engine is not started when the actual EPU request value is zero.

Figure 5:
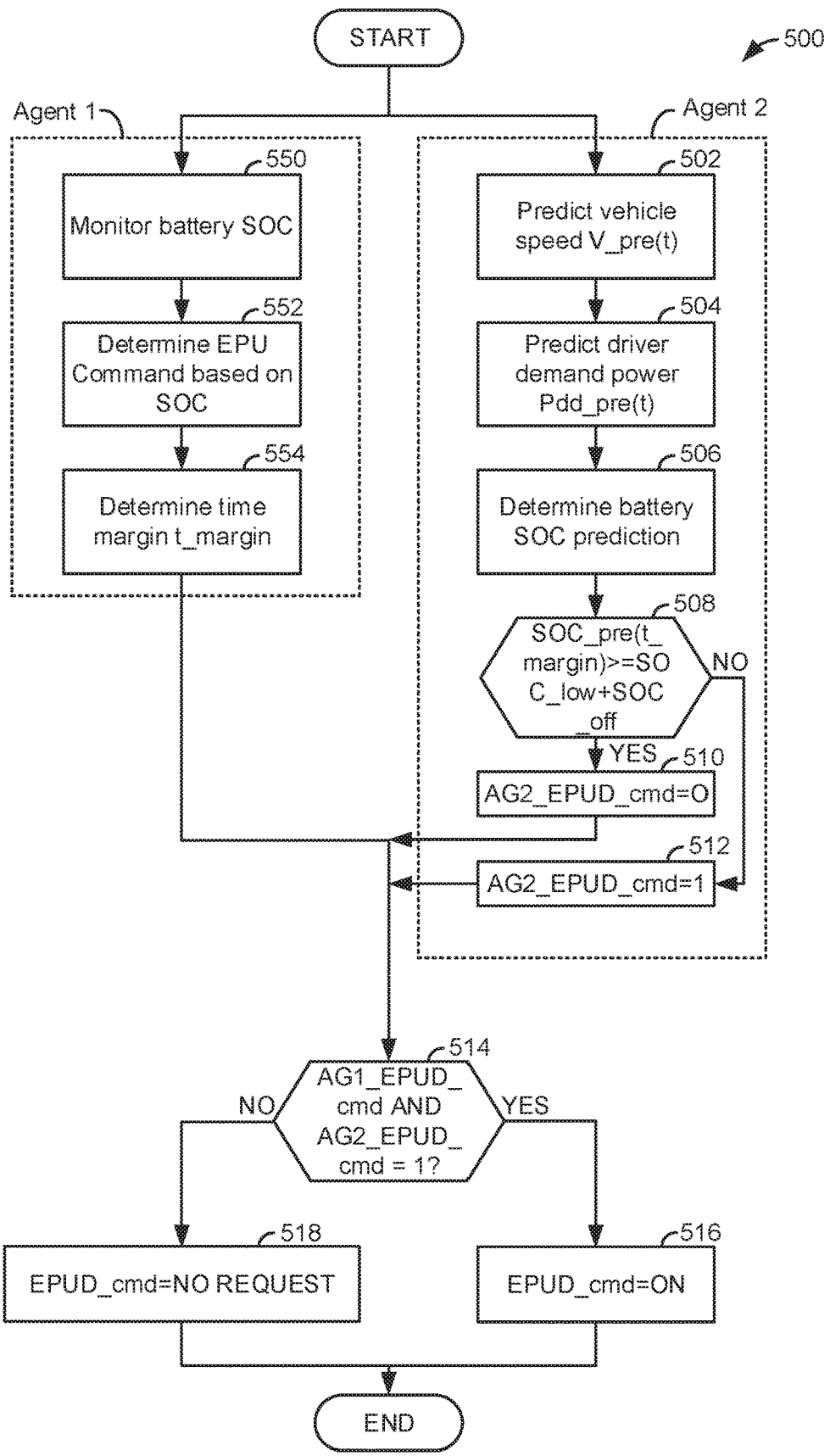

Referring now to FIG. 5, a method for deciding whether or not to start an engine or perform an engine pull-up is shown. The method of FIG. 5 may be included as executable instructions stored in non-transitory memory of the system of FIGS. 1 and 2. In addition, the methods of FIGS. 4-8 may work in cooperation with the system of FIGS. 1 and 2 to receive data and adjust actuators to control the system of FIGS. 1 and 2 in the physical or real world. The method of FIG. 5 judges to request or not request an EPU responsive to battery SOC.

At 502, the second agent (e.g., a second or module of control code) predicts vehicle speed. In one example, method 500 predicts vehicle speed based on a travel route of the vehicle and speed limits along the travel route. For example, if the vehicle is traveling on a road with a speed limit of 100 kilometers (km)/hr for the next 30 km, then method 500 may estimate vehicle speed of 100 km/hr for the next 30 km. In addition, method 500 may make adjustments to the predicted vehicle speed using traffic data and road condition data. For example, if the vehicle is traveling at 100 km/hr, but method 500 receives real time traffic data indicating that road work on the road that the vehicle is traveling has slowed vehicle speeds to 30 km/hr at a location 10 km in front of the vehicle, then vehicle speed may be predicted to be 100 km/hr for the next 9 km and then slowing to 30 km/hr for a specified distance. Method 500 may adjust the predicted vehicle speed responsive to real-time traffic data, vehicle to vehicle communication data, and vehicle to infrastructure data. In addition, if the vehicle operator has a history of driving 5 km/hr less than the posted speed limit, then method 500 may adjust the predicted vehicle speed responsive to the driver's past history. The predicted vehicle speed may be stored as a function of future time as variable V_pre(t). Method 500 proceeds to 504.

At 504, the second agent predicts driver demand power as a function of future time Pdd_pre(t). The driver demand power is predicted via the following equations:

$$\text{Pdd\_pre}(t) = \left(m\frac{dv}{dt} + F_{aero} + F_{rr} + F_{grad}\right)v$$

or $$\text{Pdd\_pre}(t) = \left(m\frac{dv}{dt} + 0.5\ \rho v^2 c_d A + mgc_{rr}\cos(\theta) + mg\sin(\theta)\right)v$$

where Pdd_pre(t) is predicted driver demand power as a function of future time, m is vehicle mass, v is vehicle speed, ρ is density of air, cd is the vehicle's coefficient of drag, A is the frontal area of the vehicle, sin and cos are trigonometric functions, θ is road angle, t is a particular instance of time and the predicted driver demand power may be determined over a time represented as a vector starting with the present time and ending at a predetermined time in the future, and g is gravitational coefficient. The driver demand power may be predicted for the entire drive path or for a predetermined distance (e.g., 10 km). Method 500 proceeds to 506.

At 506, method 500 predicts battery SOC. In one example, method 500 predicts battery SOC via recognizing that battery power is the source of power meeting the responsive to the predicted driver demand power. Method 500 estimates the battery state of charge for a duration of time that may be expressed as in vector form. Battery SOC at particular instances of time may be determined via the following equations:

$$Pbatt(t) = \text{Pdd\_pre}(t)$$

$$Pbatt(t) = VI(t) = (Voc - RI)I(t)$$

where $$I = Q\frac{d(SOC)}{dt} = Qa,\ Voc = f_1(SOC),\ R = f_2(SOC)$$

so that $Pbatt = (Voc - RQa)Qa = VocQa - RQ^2 a^2$ $$a = \frac{d(SOC)}{dt} = \frac{Voc - \sqrt{(Voc)^2 - 4RPbatt}}{2RQ}$$

$$SOC(t) = SOC_{t0} + \frac{d(SOC)}{dt}(t - t_0)$$

where R is the internal battery resistance, I is battery current, Voc is battery open circuit voltage, Q is battery charge capacity, SOC is battery state of charge as determined from predicted vehicle speed and predicted driver demand power, $t_0$ is the initial time, and t is the present time. The SOC(t) may be determined for each time increment in the time vector describing time in the future. Method 500 proceeds to 508.

At 508, method 500 judges whether or not the following conditions are met:

SOC_pre(t_margin)>=SOC_low+SOC_off where SOC_pre is the predicted battery SOC, t_margin is an amount of time in a time margin determined at 554, SOC_low is a lower bound or threshold value of the desired battery SoC operation range (e.g., below which the battery is not to be discharged), and SOC_off is an offset to the SOC lower limit (e.g., 2%). If the predicted battery SOC at time t_margin is greater than or equal to the lower battery state of charge threshold SOC_low plus SOC_off, then the answer is yes and method 500 proceeds to 510. Otherwise, the answer is no and method 500 proceeds to 512.

At 510, the second agent does not request an EPU by setting the value of variable AG2_EPUD_cmd equal to a value of zero. Thus, an EPU is not requested when predicted battery SOC is not low. Method 500 proceeds to 514.

At 512, the second agent requests an EPU by setting the value of variable AG2_EPUD_cmd to a value of one (e.g., the second agent request an EPU). Thus, an EPU is requested when predicted battery SOC is low. Method 500 proceeds to 514.

At 550, method 500 and the first control agent monitor battery SOC. SOC may be monitored via sensing battery voltage and current. Method 500 proceeds to 552.

At 552, method 500 determines whether or not to request an EPU. In one example, method 500 judges to request an EPU if the following condition is met:

SOC<=SOC_low+cal1 where SOC_low is a lower battery SoC threshold as described above and cal1 is an adjustable offset value. Thus, if battery SOC is less than the lower battery SOC plus the adjustable offset, then method 500 requests an EPU. If battery SOC is not less than the lower battery SOC plus the adjustable offset, then method 500 does not request an EPU. Method 500 proceeds to 554.

At 554, method 500 determines a time margin. The time margin may be determined via the following equation:

$$\text{t\_margin} = \frac{(SOC\_low - SOC\_min)}{\frac{d(SOC1)}{dt}}$$

where t_margin is the margin time, SOC_low is a battery SOC lower threshold as described above, SOC_min is a battery SOC minimum below which battery discharge is disallowed, and where d(SOC1)/dt is a derivative of battery SOC at a present instant in time or averaged over a previous time window (e.g., from t1 to t2). Thus, the time t_margin is the amount of time it would take the battery to discharge from the lower battery SOC threshold to the minimum battery SOC threshold at the present rate of change of SOC. The first agent may provide the second agent with the time t_margin. Method 500 proceeds to 514.

At 514, method 500 arbitrates between requests or absence of requests for EPU from the first agent and requests or absence of requests for EPU from the second agent. In particular, if a logical "AND" performed on the variable AG1_EPUD_cmd and the variable AG2_EPUD_cmd results in a value of one, then the answer is yes and method 500 proceeds to 516. Otherwise, the answer is no and method 500 proceeds to 518. In some example, method 500 may also proceed to 514 if SOC is equal to or less than the SOC minimum threshold.

At 518, method 500 adjusts the value of EPUD_cmd to a state of no request and does not request an engine start or pull-up. A no request from the SOC monitoring control code indicates that the engine will not be started via this section of control code. However, an EPU request may be generated via other control code sections and the engine may be started responsive to that request. Method 500 exits.

At 516, method 500 adjusts the value of EPUD_cmd to a value of one or on and actually requests an engine start or pull-up. The engine is started in response to the actual request to start the engine. Method 500 proceeds to exit.

Thus, method 500 includes two agents that may individually request an engine pull-up or start. Method 500 actually requests an engine start, and the engine is started, in response to both the first agent and the second agent simultaneously and contemporaneously requesting an engine start. In this way, it may be possible to start an engine when engine starting is more likely to provide useful benefits.

Figure 6:
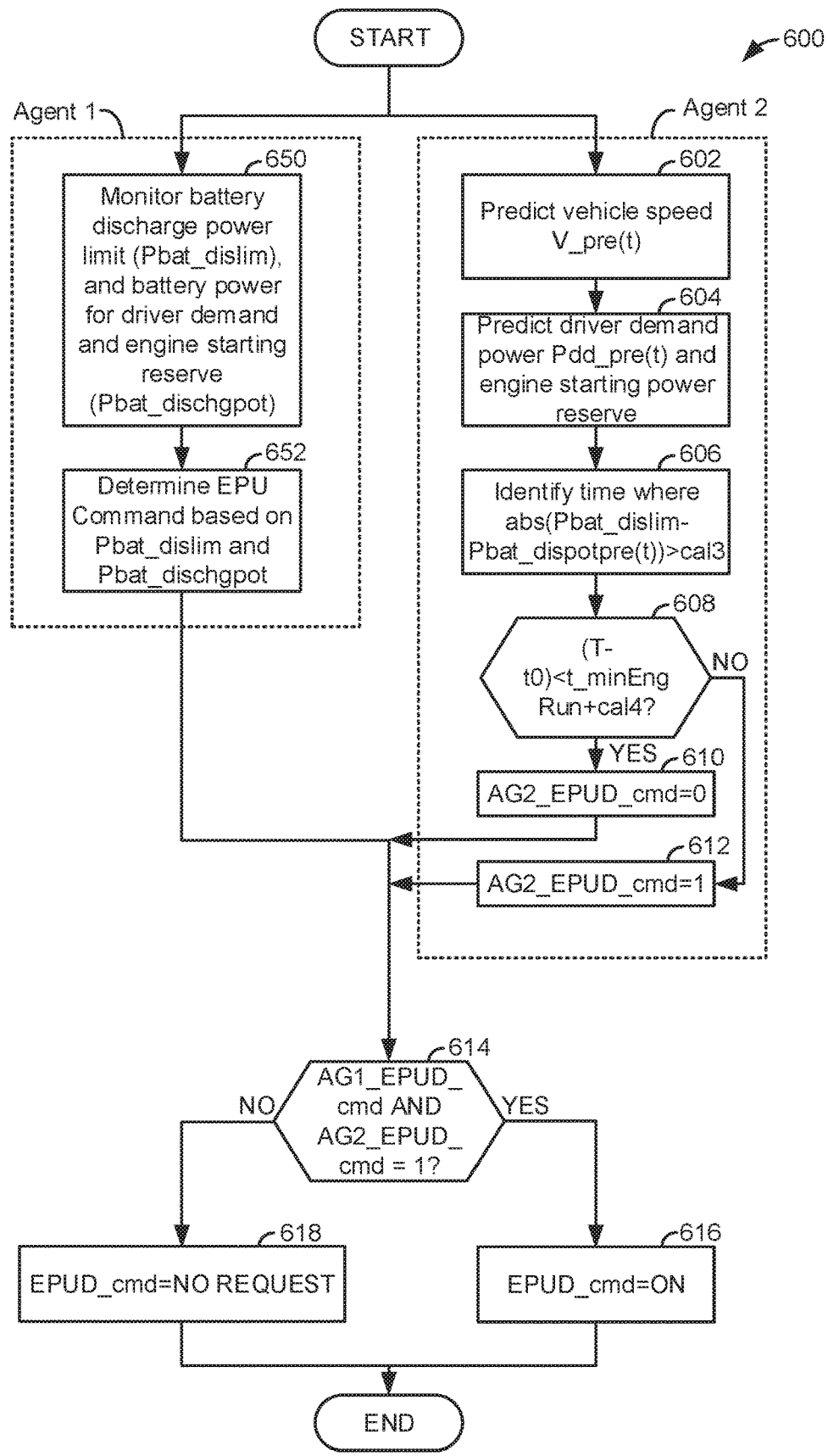

Referring now to FIG. 6, a method for deciding whether or not to start an engine or perform an engine pull-up is shown. The method of FIG. 6 may be included as executable instructions stored in non-transitory memory of the system of FIGS. 1 and 2. In addition, the methods of FIGS. 4-8 may work in cooperation with the system of FIGS. 1 and 2 to receive data and adjust actuators to control the system of FIGS. 1 and 2 in the physical or real world. The method of FIG. 6 judges to request or not request an EPU responsive to battery discharge power buffer (e.g., a numerical difference between a battery discharge power level that is not to be exceeded and an amount of electric power supplied to meet driver demand power and electric power to start an engine).

At 602, the second agent (e.g., a second or module of control code) predicts vehicle speed. In one example, method 600 predicts vehicle speed based on a travel route of the vehicle and speed limits along the travel route. In addition, method 600 may make adjustments to the predicted vehicle speed using traffic data and road condition data. Method 600 may adjust the predicted vehicle speed responsive to real-time traffic data, vehicle to vehicle communication data, and vehicle to infrastructure data. In addition, if the vehicle operator has a history of driving 5 km/hr less than the posted speed limit, then method 600 may adjust the predicted vehicle speed responsive to the driver's past history. The predicted vehicle speed may be stored as a function of future time as variable V_pre(t). Method 600 proceeds to 604.

At 604, the second agent predicts driver demand power as a function of future time Pdd_pre(t) as is described at 504 of FIG. 5. Further, method 600 determines an amount of power reserved for engine starting. In one example, the amount of power reserved for engine starting may be determined via referencing or indexing a table of function of empirically determined amounts of power that it takes to crank and start the engine. The table or function may be referenced via engine temperature and time since the most recent engine stop. The predicted driver demand power and the amount of power reserved for engine starting are added and stored in variable Pbat_dispotpre(t). Method 600 proceeds to 606.

At 606, method 600 identifies a future time where the following condition is met consistently for a predetermined period of time (e.g., 5 seconds) to ensure the condition is not transitory but rather sustained:

$$abs(Pbat\_dislim - Pbat\_dispotpre(t)) > cal3$$

where Pbat_dislim is the battery power discharge limit (e.g., a maximum amount of power in a next half second that may be discharged from a battery) or a battery discharge power upper threshold, which is determined at 650, abs is absolute value, and Pbat_dispotpre(t) is the sum of predicted driver demand power and the amount of power reserved for engine starting. Method 600 may evaluate the condition for a predetermined amount of time into the future via applying the predicted driver demand to determine whether or not the condition is met within a predetermined future time (e.g., 2 minutes from the present time). Method 600 proceeds to 608 after determining times in the future where the aforementioned condition is met.

At 608, method 600 judges whether or not the following conditions are met:

$$(T - t0) <= t\_min\ EngRun + cal4$$

where T is a time in the future where the condition of step 606 is met, t0 is the present time, t_min EngRun is a minimum desired engine run time (e.g., it may be desired that the engine runs for at least 3 minutes), and cal4 is a predetermined adjustable time (e.g., 30 seconds) that is an offset to t_min EngRun. If the (T−t0) is less than or equal to t_min EngRun it means that battery power consumption will or is predicted to drop right after EPU, therefore, the answer is yes and method 600 proceeds to 610. Otherwise, the answer is no and method 600 proceeds to 612.

At 610, the second agent does not request an EPU by setting the value of variable AG2_EPUD_cmd equal to a value of zero. Thus, an EPU is not requested when the predicted battery discharge power buffer is consistently greater than a predetermined value immediately following engine start (e.g., (T−t0)<=t_min EngRun+cal4). Method 600 proceeds to 614.

At 612, the second agent requests an EPU by setting the value of variable AG2_EPUD_cmd to a value of one (e.g., the second agent request an EPU). Thus, an EPU is requested when the predicted battery discharge power buffer becomes consistently greater than a predetermined value only a long time after engine start (e.g., (T−t0)>t_min EngRun+cal4). Method 600 proceeds to 614.

At 650, method 600 and the first control agent monitor a first battery discharge power limit. In one example, the battery discharge power limit is empirically determined or calculated in advance and stored in a table or function. The table or function may be referenced or indexed via battery SOC and battery temperature. The table or function outputs the first battery discharge power limit values (e.g., Pbat_dislim). In addition, method 600 determines the driver demand power and an amount of engine power reserved for engine starting. In one example, method 600 determines driver demand power from accelerator pedal position and vehicle speed. In particular, accelerator pedal position and vehicle speed index or reference a table that holds empirically determined values of driver demand power and the table outputs the driver demand power. The amount of power reserved for engine starting may be determined via referencing or indexing a table of function of empirically determined amounts of power that it takes to crank and start the engine. The table or function may be referenced via engine temperature and time since the most recent engine stop. The amount of power reserved for engine starting and the driver demand power are added together and stored in memory as variable Pbat_dischgpot. Method 600 proceeds to 652.

At 652, method 600 determines whether or not to request an EPU. In one example, method 600 judges to request an EPU if the following condition is met:

$$abs(Pbat\_dislim - Pbat\_dischgpot) <= cal2$$

where Pbat_dislim is the battery discharge limit for engine starting, abs is absolute value of (arg), Pbat_dischgpot is the sum of driver demand power and power reserved to start the engine, and cal2 is a predetermined value. Thus, if the battery discharge power buffer is less than cal2, then method 600 requests an EPU. If battery discharge power buffer is not less than cal2, then method 600 does not request an EPU. Method 600 proceeds to 614.

At 614, method 600 arbitrates between requests or absence of requests for EPU from the first agent and requests or absence of requests for EPU from the second agent. In particular, if a logical "AND" performed on the variable AG1_EPUD_cmd and the variable AG2_EPUD_cmd results in a value of one, then the answer is yes and method 600 proceeds to 616. Otherwise, the answer is no and method 600 proceeds to 618.

At 618, method 600 adjusts the value of EPUD_cmd to a state of no request and does not request an engine start or pull-up. A no request from the battery discharge power buffer monitoring control code indicates that the engine will not be started via this section of control code. However, an EPU request may be generated via other control code sections and the engine may be started responsive to that request. Method 600 exits.

At 616, method 600 adjusts the value of EPUD_cmd to a value of one or on and actually requests an engine start or pull-up. The engine is started in response to the actual request to start the engine. Method 600 proceeds to exit.

Thus, method 600 includes two agents that may individually request an engine pull-up or start. Method 600 actually requests an engine start, and the engine is started, in response to both the first agent and the second agent simultaneously and contemporaneously requesting an engine start. In this way, it may be possible to start an engine when engine starting is more likely to provide useful benefits.

Figure 7:
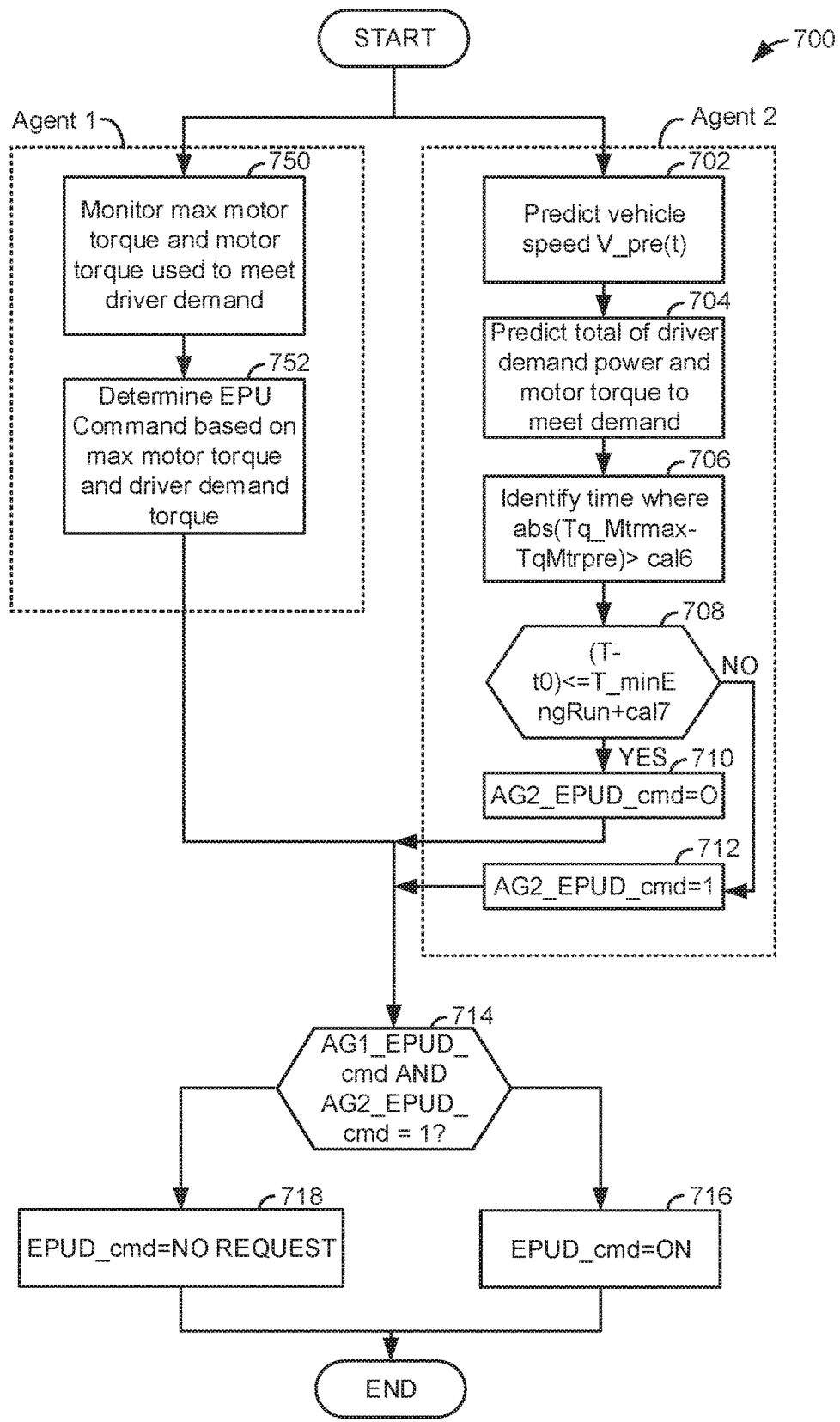

Referring now to FIG. 7, a method for deciding whether or not to start an engine or perform an engine pull-up is shown. The method of FIG. 7 may be included as executable instructions stored in non-transitory memory of the system of FIGS. 1 and 2. In addition, the methods of FIGS. 4-8 may work in cooperation with the system of FIGS. 1 and 2 to receive data and adjust actuators to control the system of FIGS. 1 and 2 in the physical or real world. The method of FIG. 7 judges to request or not request an EPU responsive to motor torque buffer at a particular instant of time.

At 702, the second agent (e.g., a second or module of control code) predicts vehicle speed. In one example, method 700 predicts vehicle speed based on a travel route of the vehicle and speed limits along the travel route. In addition, method 700 may make adjustments to the predicted vehicle speed using traffic data and road condition data. Method 700 may adjust the predicted vehicle speed responsive to real-time traffic data, vehicle to vehicle communication data, and vehicle to infrastructure data. In addition, if the vehicle operator has a history of driving 5 km/hr less than the posted speed limit, then method 700 may adjust the predicted vehicle speed responsive to the driver's past history. The predicted vehicle speed may be stored as a function of future time as variable V_pre(t). Method 700 proceeds to 704.

At 704, the second agent predicts driver demand power as a function of future time Pdd_pre(t) as is described at 504 of FIG. 5. Further, method 700 determines an amount of motor torque (e.g., predicted motor torque) to meet the predicted driver demand power. The motor torque may be provided via starter/generator 340 shown in FIG. 2. In one example, method 700 determines the predicted motor torque via the following equations:

$$P_{mtr} = \text{Pdd\_pre}(t) = Tq_{whl} \cdot \frac{v}{R}$$

$$Tq_{whl} = \frac{\text{Pdd\_pre}(t)}{v} \cdot R$$

$$TqMtrpre = \frac{Tq_{whl}}{rt}$$

where $P_{mtr}$ is predicted power provided by the motor, Pdd_pre(t) is predicted driver demand power, $Tq_{whl}$ is wheel torque, v is predicted vehicle speed, R is tire radius, TqMtrpre is predicted motor torque, and rt is a torque ratio between the wheel and the motor. Method 700 proceeds to 706.

At 706, method 700 identifies a future time where the absolute value of predicted motor torque buffer (e.g., Tq_Mtr Max−TqMtrPre) is greater than a predetermined value (cal6) is met consistently for a predetermined amount of time:

$$abs(Tq\_Mtr\ Max - TqMtrpre) > cal6$$

where Tq_Mtr Max is a maximum allowable motor torque, TqMtrpre is predicted motor torque from 704, and cal6 is a predetermined amount of torque. Method 700 may evaluate the above condition for a predetermined amount of time into the future via applying the predicted motor torque to determine whether or not the condition is met within a predetermined future time (e.g., 2 minutes from the present time). Method 700 proceeds to 708 after determining times in the future where the aforementioned condition is met.

At 708, method 700 judges whether or not the following conditions are met:

$$(T-t0) <= t\_min\_EngRun + cal7$$

where T is a time in the future where the condition of step 706 is met, t0 is the present time, t_min EngRun is a minimum desired engine run time (e.g., it may be desired that the engine runs for at least 3 minutes), and cal7 is a predetermined adjustable time (e.g., 30 seconds) that is an offset to t_min EngRun. If the (T−t0) is less than or equal to t_min EngRun it means that motor torque request will or is predicted to drop right after EPU, therefore, the answer is yes and method 700 proceeds to 710. Otherwise, the answer is no and method 700 proceeds to 712.

At 710, the second agent does not request an EPU by setting the value of variable AG2_EPUD_cmd equal to a value of zero. Thus, an EPU is not requested when the predicted motor torque buffer is greater than a threshold right after engine start if commanded as such. Method 700 proceeds to 714.

At 712, the second agent requests an EPU by setting the value of variable AG2_EPUD_cmd to a value of one (e.g., the second agent request an EPU). Thus, an EPU is requested when the predicted motor torque buffer is greater than a threshold long after engine start is commanded. Method 700 proceeds to 714.

At 750, method 700 and the first control agent monitor the maximum motor torque and motor torque to meet driver demand torque. In one example, the maximum motor torque threshold is empirically determined or calculated in advance and stored in a table or function. The table or function may be referenced or indexed via battery SOC and motor temperature. The table or function outputs a maximum motor torque (e.g., Tq_Mtr Max, a maximum amount of torque that may be output from the motor) or motor torque upper threshold. In addition, method 700 determines the motor torque to meet the driver demand power. In one example, the motor torque may be determined via referencing or indexing a table or function of motor torque values via current supplied to the motor and motor speed. The table output the motor torque to meet driver demand (e.g., TqMtrDD). Method 700 proceeds to 752.

At 752, method 700 determines whether or not to request an EPU. In one example, method 700 judges to request an EPU if the following condition is met:

$$\text{abs}(Tq\_Mtr\ Max-TqMtrDD)<=cal5$$

where Tq_Mtr Max is the maximum motor torque threshold, TqMtrDD is motor torque to meet driver demand, abs is absolute value of (arg), and cal5 is a predetermined value. Thus, if the motor torque buffer is less than cal5, then method 700 requests an EPU. If the motor torque buffer is not less than cal5, then method 700 does not request an EPU. Method 700 proceeds to 714.

At 714, method 700 arbitrates between requests or absence of requests for EPU from the first agent and requests or absence of requests for EPU from the second agent. In particular, if a logical "AND" performed on the variable AG1_EPUD_cmd and the variable AG2_EPUD_cmd results in a value of one, then the answer is yes and method 700 proceeds to 716. Otherwise, the answer is no and method 700 proceeds to 718.

At 718, method 700 adjusts the value of EPUD_cmd to a state of no request and does not request an engine start or pull-up. A no request from the motor torque buffer code indicates that the engine will not be started via this second of control code. However, an EPU request may be generated via other control code sections and the engine may be started responsive to that request. Method 700 exits.

At 716, method 700 adjusts the value of EPUD_cmd to a value of one or on and actually requests an engine start or pull-up. The engine is started in response to the actual request to start the engine. Method 700 proceeds to exit.

Thus, method 700 includes two agents that may individually request an engine pull-up or start in response to motor torque limitations. Method 700 actually requests an engine start, and the engine is started, in response to both the first agent and the second agent simultaneously and contemporaneously requesting an engine start due to motor torque limitations. In this way, it may be possible to start an engine when engine starting is more likely to provide useful benefits.

Figure 8:
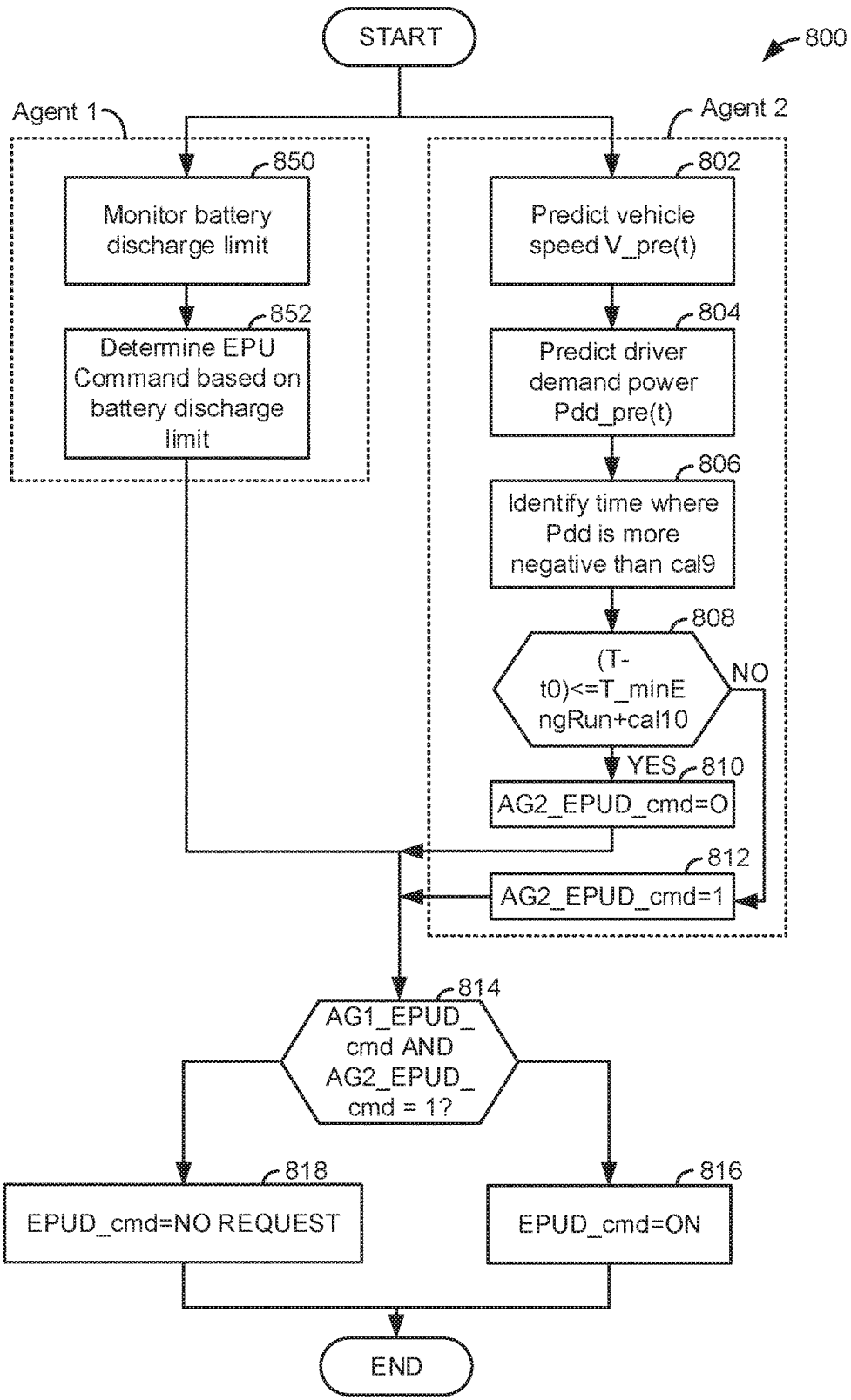

Referring now to FIG. 8, a method for deciding whether or not to start an engine or perform an engine pull-up is shown. The method of FIG. 8 may be included as executable instructions stored in non-transitory memory of the system of FIGS. 1 and 2. In addition, the methods of FIGS. 4-8 may work in cooperation with the system of FIGS. 1 and 2 to receive data and adjust actuators to control the system of FIGS. 1 and 2 in the physical or real world. The method of FIG. 8 judges to request or not request an EPU responsive to a battery discharge limit or upper threshold.

At 802, the second agent (e.g., a second or module of control code) predicts vehicle speed. In one example, method 800 predicts vehicle speed based on a travel route of the vehicle and speed limits along the travel route. In addition, method 800 may make adjustments to the predicted vehicle speed using traffic data and road condition data. Method 800 may adjust the predicted vehicle speed responsive to real-time traffic data, vehicle to vehicle communication data, and vehicle to infrastructure data. In addition, if the vehicle operator has a history of driving 5 km/hr less than the posted speed limit, then method 800 may adjust the predicted vehicle speed responsive to the driver's past history. The predicted vehicle speed may be stored as a function of future time as variable V_pre(t). Method 800 proceeds to 804.

At 804, the second agent predicts driver demand power as a function of future time Pdd_pre(t) as is described at 504 of FIG. 5. Method 800 proceeds to 806.

At 806, method 800 identifies a future time where the following condition is met consistently for a predetermined period of time:

$$Pdd\_pre(t)<cal9$$

where cal9 is a predetermined driver demand power. Method 800 may evaluate the condition for a predetermined amount of time into the future via applying the predicted driver demand to determine whether or not the condition is met within a predetermined future time (e.g., 2 minutes from the present time). Method 800 proceeds to 808 after determining times in the future where the aforementioned condition is met.

At 808, method 800 judges whether or not the following conditions are met:

$$(T-t0)<=t\_min\ EngRun+cal10$$

where T is a time in the future where the condition of step 806 is met, t0 is the present time, t_min EngRun is a minimum desired engine run time (e.g., it may be desired that the engine runs for at least 3 minutes), and cal10 is a predetermined adjustable time (e.g., 30 seconds) that is an offset to t_min EngRun. If the (T-t0) is less than or equal to t_min EngRun it means that battery power consumption will or is predicted to drop right after EPU, therefore, the answer is yes and method 800 proceeds to 810. Otherwise, the answer is no and method 800 proceeds to 812.

At 810, the second agent does not request an EPU by setting the value of variable AG2_EPUD_cmd equal to a value of zero. Thus, an EPU is not requested when predicted battery discharge is less than a threshold right after engine start if commanded as such. Method 800 proceeds to 814.

At 812, the second agent requests an EPU by setting the value of variable AG2_EPUD_cmd to a value of one (e.g., the second agent request an EPU). Thus, an EPU is requested when predicted battery discharge power is greater than a threshold right after engine start if commanded as such. Method 800 proceeds to 814.

At 850, method 800 and the first control agent monitor a second battery discharge power limit (e.g., an upper threshold not to be exceeded for vehicle driving conditions). In one example, the battery discharge power limit is empirically determined or calculated in advance and stored in a table or function. The table or function may be referenced or indexed via battery SOC and battery temperature. The table or function outputs battery discharge power limit values (e.g., Pbat_dislim2). Method 800 proceeds to 852.

At 852, method 800 determines whether or not to request an EPU. In one example, method 800 judges to request an EPU if the following condition is met:

$$\text{abs}(Pbat\_dislim2)<=cal8$$

where Pbat_dislim2 is the battery discharge limit for vehicle propulsion, abs is absolute value of (arg), and cal8 is a predetermined value. Thus, if the battery discharge limit is less than or equal to cal8, then method 800 requests an EPU. If battery discharge limit is not less than cal8, then method 800 does not request an EPU. Method 800 proceeds to 814.

At 814, method 800 arbitrates between requests or absence of requests for EPU from the first agent and requests or absence of requests for EPU from the second agent. In particular, if a logical "AND" performed on the variable AG1_EPUD_cmd and the variable AG2_EPUD_cmd results in a value of one, then the answer is yes and method 800 proceeds to 816. Otherwise, the answer is no and method 800 proceeds to 818.

At 818, method 800 adjusts the value of EPUD_cmd to a state of no request and does not request an engine start or pull-up. A no request from the battery discharge limit monitoring control code indicates that the engine will not be started via this section of control code. However, an EPU request may be generated via other control code sections and the engine may be started responsive to that request. Method 800 exits.

At 816, method 800 adjusts the value of EPUD_cmd to a value of one or on and actually requests an engine start or pull-up. The engine is started in response to the actual request to start the engine. Method 800 proceeds to exit.

Thus, method 800 includes two agents that may individually request an engine pull-up or start. Method 800 actually requests an engine start, and the engine is started, in response to both the first agent and the second agent simultaneously and contemporaneously requesting an engine start due to battery discharge conditions.

The methods of FIGS. 4-8 provide for a powertrain operating method, comprising: receiving data to a controller; adjusting a state of a first engine start request generated via a first control agent responsive to the data; adjusting a state of a second engine start request generated via a second control agent responsive to predicted vehicle conditions; and starting or not starting an engine responsive to arbitration of the first engine start request and the second engine start request. The method includes where the first control agent is a first module of executable instructions stored in memory of a controller. The method includes where the second control agent is a second module of executable instructions stored in memory of the controller. The method includes where the arbitration includes performing a logical "AND" operation of the first engine start request and the second engine start request. The method includes wherein the engine is started when the logical "AND" operation results in a value of one. The method includes where an engine start request is not generated when the logical "AND" operation results in a value of zero. The method includes where the first engine start request is based on present vehicle operating conditions. The method includes where the second engine start request is based on predicted vehicle operating conditions.

The methods of FIGS. 4-8 provide for a powertrain operating method, comprising: receiving data to a controller; monitoring a first control parameter and generating a first engine start request responsive to the first control parameter via a first control agent; predicting a value of a second control parameter and generating a second engine start request responsive to the predicted value via a second control agent; and starting or not starting an engine responsive to the first engine start request and the second engine start request. The method includes where the engine is started in response to the first engine start request being asserted and the second engine start request being asserted. The method includes where the first control parameter is battery state of charge, and where the second control parameter is a battery state of charge prediction based on predicted driver demand power. The method includes where the first control parameter is a battery discharge threshold, and where the second control parameter is a time where a predetermined condition occurs. The method includes where the first control parameter is motor torque upper threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A powertrain operating method, comprising:
adjusting a state of a first engine start request generated via a first control agent responsive to a battery discharge limit;
adjusting a state of a second engine start request generated via a second control agent responsive to a predicted driver demand power; and
starting or not starting an engine via a controller responsive to arbitration of the first engine start request that is based on the battery discharge limit and the second engine start request that is based on the predicted driver demand power.

2. The method of claim 1, where the first control agent is a first module of executable instructions stored in memory of the controller.

3. The method of claim 2, where the second control agent is a second module of executable instructions stored in memory of the controller.

4. The method of claim 2, where the arbitration includes performing a logical "AND" operation of the first engine start request and the second engine start request.

5. The method of claim 4, wherein the engine is started when the logical "AND" operation results in a value of one.

6. The method of claim 4, where an engine start request is not generated when the logical "AND" operation results in a value of zero.

7. The method of claim 1, where the first engine start request is based on present vehicle operating conditions.

8. The method of claim 7, where the second engine start request is based on predicted vehicle operating conditions.

9. A powertrain operating method, comprising:
receiving data to a controller;
monitoring a first control parameter and generating a first engine start request responsive to the first control parameter via a first control agent, where the first control parameter is a battery state of charge;
predicting a value of a second control parameter and generating a second engine start request responsive to the predicted value via a second control agent, where the second control parameter is a predicted battery state of charge that is based on predicted driver demand power; and
starting or not starting an engine responsive to the first engine start request and the second engine start request.

10. The method of claim 9, where the engine is started in response to the first engine start request being asserted and the second engine start request being asserted, and where the first control parameter is a battery discharge threshold.

11. The method of claim 9, further comprising generating the second engine start request in response to the predicted battery state of charge not being greater than a predetermined battery state of charge plus an offset value.

12. The method of claim 9, where the first control parameter is a battery discharge power buffer, and where the second control parameter is a time where a predetermined condition occurs.

13. The method of claim 9, where the first control parameter is motor torque buffer, and where the second control parameter is a time where a predetermined condition occurs.

14. A system, comprising:
an engine;
a motor/generator selectively coupled to the engine; and
a controller including executable instructions stored in non-transitory memory to generate a first engine start request responsive to present vehicle operating conditions via a first control agent, instructions to generate a second engine start request responsive to predicted vehicle operating conditions via a second control agent, and instructions to start or not start the engine responsive to the first engine start request and the second engine start request, and additional instructions to predict vehicle speed and driver demand torque via the second control agent.

15. The system of claim 14, further comprising additional instructions to determine a time at which a predicted driver demand power is less than a predetermined driver demand power.

16. The system of claim 14, further comprising additional instructions to determine a time a condition is met, the condition being a basis for generating the second engine start request.

17. The system of claim 16, where the second engine start request is generated further based on a desired minimum engine run time.

18. The system of claim 14, where the engine is stopped when the first and second engine start requests are generated.

19. The system of claim 14, where the engine is started when both the first engine start request and the second engine start request are contemporaneously asserted.

20. The system of claim 19, where an engine request is not generated when both the first engine start request and the second engine start request are not contemporaneously asserted.

* * * * *